(No Model.)
J. S. GILMORE.
LATHE CHUCK.
No. 295,628. Patented Mar. 25, 1884.
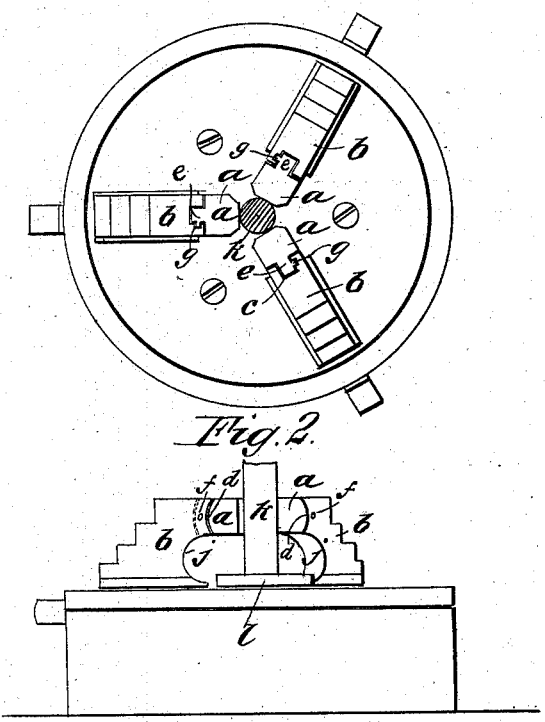
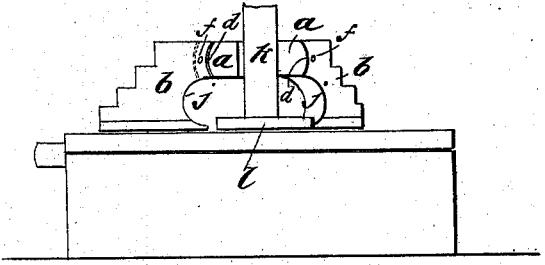
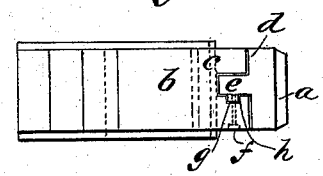
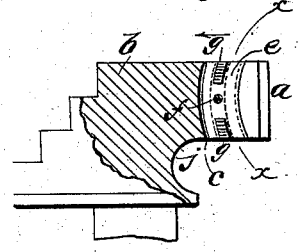
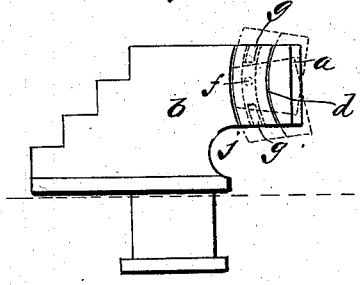
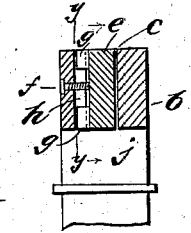
WITNESSES:
F. McArdle.
C. Sedgwick
INVENTOR:
J. S. Gilmore
BY Munn & Co
ATTORNEYS.

UNITED STATES PATENT OFFICE.

JAMES S. GILMORE, OF PHILADELPHIA, PENNSYLVANIA.

LATHE-CHUCK.

SPECIFICATION forming part of Letters Patent No. 295,628, dated March 25, 1884.

Application filed November 5, 1883. (No model.)

*To all whom it may concern:*

Be it known that I, JAMES S. GILMORE, of Philadelphia, in the county of Philadelphia and State of Pennsylvania, have invented a new and useful Improvement in Lathe-Chucks, of which the following is a full, clear, and exact description.

This invention pertains to improvements in lathe-chucks; and it consists of the combination and construction of parts, substantially as hereinafter fully set forth, and pointed out in the claim.

Reference is to be had to the accompanying drawings, forming part of this specification, in which similar letters of reference indicate corresponding parts in all the figures.

Figure 1 is a front elevation of my improved lathe-chuck. Fig. 2 is a side elevation with one of the jaws removed. Fig. 3 is a front elevation of one of the jaws. Fig. 4 is a side elevation of one of the jaws. Fig. 5 is a detail in section on the line $y\ y$, Fig. 6; and Fig. 6 is a detail in section on the line $x\ x$ of Fig. 5.

I fit a self-adjusting jaw-face, $a$, in each of the jaws $b$ by making the jaw proper concave on its face in the direction of the axis of the chuck, and grooving the jaw at $c$ in the same direction, and providing the faces $a$ with a corresponding convex back, $d$, and tongue $e$ thereon to fit in the jaw and groove, as shown, where I secure said jaw-faces $a$ by a stud-pin, $f$, screwing through one side of the jaw to a notch between two short side ribs, $g$, or studs on the tongue $e$ and sliding in a lateral groove, $h$, of the jaw communicating with the groove for the tongue $e$. These jaw-faces $a$, thus fitted by curved seats on the jaws proper, and being free to move along said seats within the limits of the studs $g$ and $f$, will readily come to a bearing self-actingly on any tapered object not too tapering, by the pressure of the said faces on said objects when screwed up to grip them, whether by universal adjusting devices or independently-acting devices. I also propose to construct the jaws $a$ with undercut notches at $j$, to make a clear space behind the gripping-faces to enable the said gripping-faces to grip the shank $k$ of a bolt over the head $l$, so that a headed object like a bolt or screw may be readily chucked to enable the front end of the shank to be turned or screw-threaded in the lathe.

I do not mean to limit myself to the particular contrivance of devices here shown for securing the tongue-and-grooved jaws and jaw-faces together, as it is obvious that other contrivances may be used for the purpose.

It is to be understood that cylindrical pieces may be chucked as well with the adjusting-faces $a$ as with the common jaws, the said faces alike adapting themselves to such shapes as to tapered shapes.

Having thus fully described my invention, I claim as new and desire to secure by Letters Patent—

The jaw-face $a$, connected to the jaw $b$ by a tongue-and-groove device having a lateral tongue and groove, $g\ h$, and a fastening-stud, $f$, the said lateral tongue being notched for the fastening-stud, substantially as described.

JAMES S. GILMORE.

Witnesses:
JOHN SHALLCROSS,
GEORGE PUTT.